S. HOUGH.
BALL BEARING HANDLE FOR MILK CANS AND SIMILAR CONTAINERS.
APPLICATION FILED SEPT. 18, 1916.

1,223,880.

Patented Apr. 24, 1917.

INVENTOR
Samuel Hough
W. W. Williamson
Atty.

UNITED STATES PATENT OFFICE.

SAMUEL HOUGH, OF ATCO, NEW JERSEY, ASSIGNOR OF ONE-THIRD TO JOSEPH LAYER, OF BERLIN, NEW JERSEY, AND ONE-THIRD TO CHARLES JOHN GLASER, OF CAMDEN, NEW JERSEY.

BALL-BEARING HANDLE FOR MILK-CANS AND SIMILAR CONTAINERS.

1,223,880.  Specification of Letters Patent.  Patented Apr. 24, 1917.

Application filed September 18, 1916. Serial No. 120,722.

*To all whom it may concern:*

Be it known that I, SAMUEL HOUGH, a citizen of the United States, residing at Atco, in the county of Camden and State of New Jersey, have invented new and useful Improvements in Ball-Bearing Handles for Milk-Cans and Similar Containers, of which the following is a specification.

My invention relates to new and useful improvements in ball bearing handles for milk cans and similar containers, and has for its object to provide an exceedingly simple and effective device of this character, preferably carried by the can top, whereby the person handling the can may readily and quickly roll the same on its lower edge without continually changing the hand hold or twisting the wrist.

Another object of the invention is to provide a can or container with a swiveled handle whereby said handle may be gripped by the person handling the same for tipping the can on its edge and rolling the same, the can revolving about the handle while the latter remains stationary in the person's hand.

A further object of the invention is to provide a ball bearing or swiveled handle carried by the top of a milk can and so arranged as to be almost entirely inclosed, the can top having a chamber for containing the handle whereby the latter does not project beyond the edge of the top, so that said handle will not likely come in contact with an object which might bend or break the same.

With these ends in view, my invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawing forming a part of this application, in which—

Figure 1:
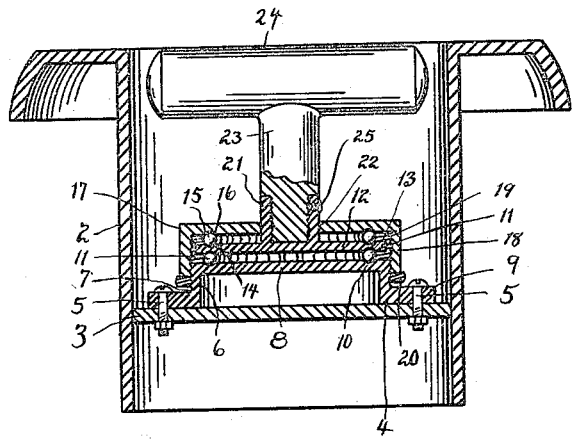
Figure 2:
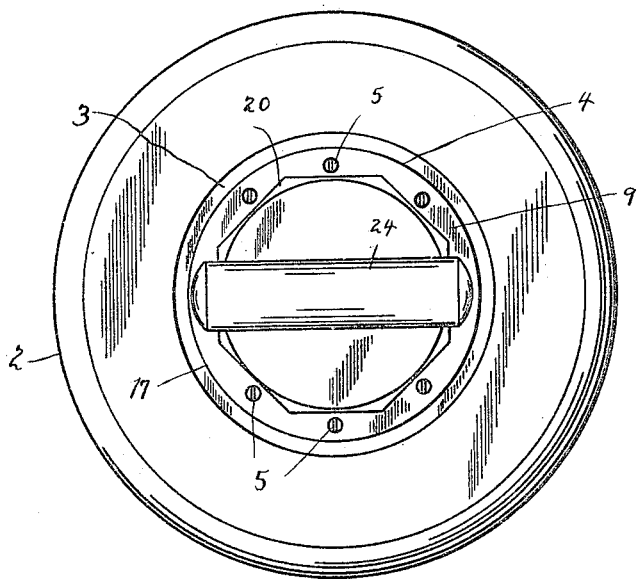

Figure 1, is a vertical sectional view of a can top showing my invention applied thereto; and Fig. 2, is a plan view thereof.

In carrying out my invention as here embodied 2 represents a milk can top, but it is to be understood that I do not limit myself to the use thereof with milk cans, as the same might be used with any large containers which can be moved about by rolling the same upon its lower edge.

This can top is provided with a supporting wall or partition 3, to which is fastened a base member 4 by suitable fastening devices 5, such as bolts and nuts as here shown. The base member comprises a body 6 threaded exteriorly as at 7, a top wall 8 and a flange 9 through which the fastening devices 5 pass. In the top wall 8 is formed the annular ball race or groove 10 in which are mounted the ball bearings 11. On these ball bearings is mounted the rotary disk 12 having a ball race or groove 13 in its underface for registering with the ball bearings 11, and in the upper face is formed a similar ball race or groove 14, in which are mounted the ball bearings 15. The last named ball bearings register with a ball race or groove 16 formed in the inner face of the cover member 17, the latter being provided with a flange 18 threaded interiorly as at 19, so that the same may be screwed upon the body portion of the base member 4 for closing the rotary disk and adjusting the tension upon the ball bearings.

Before the cover member 17 is placed in position, a lock nut 20 is threaded onto the body portion of the base member, and when the proper adjustment of the cover member is obtained, the lock nut is jammed against the inner edge of the cover member for securely locking the same in position. The rotary disk 12 is provided with a central outwardly projecting socket 21 which passes through a central opening or hole 22 in the cover member, and this socket is preferably threaded to receive the threaded end of the shank 23 of the handle 24, and when said handle has been screwed home, the same is held in its proper position about a set screw 25 threaded through the socket 21 and engaging the shank of the handle, the latter being spotted if so desired.

The handle 24 as will be readily seen from Fig. 1, lies below the upper edge of the can top, so that the same will not come in contact with outside obstacles, thereby preventing the same from being bent or broken off. The chamber in the can top in which the handle and its analogous parts are mounted is of sufficient size to permit the ready insertion of a hand of a person handling the cans or containers, to which this device is attached, thereby permitting the handle to be readily gripped when the can is to be moved from one place to another.

In practice when it is desired to move a can having this invention applied thereto, it is only necessary to grip the handle 24, tip the can upon its edge. Then by applying proper force to move the can, the same will be rolled along its lower edge with the can revolving about the handle, the latter remaining stationary in the hand of the operator.

Should the can top be removed from the can and the same accidentally drop, it is very unlikely that the handle will come in contact with any object, so that the same will not be bent, broken or otherwise injured, thereby greatly adding to the life of the device.

Of course I do not wish to be limited to the exact details of construction as here shown, as these may be varied within the limits of the appended claims without departing from the spirit of my invention.

Having thus fully described my invention, what I claim as new and useful, is—

1. A new article of manufacture comprising a can top having a chamber with a handle swiveled thereto and entirely contained within said chamber.

2. In a device of the character stated a supporting wall, a base member carried by said supporting wall, a cover member detachably secured to said base member, a rotary disk mounted between said members, and a handle carried by said disk.

3. In a device of the character stated a supporting wall, a base member detachably secured thereto, a cover member detachably secured to the base member, said cover member having a hole therein, a disk rotatably mounted between said members, said disk having a socket projecting through the opening in the cover member, ball bearings arranged between the rotary disk and said members, and a handle mounted in said socket.

4. A can top having a supporting wall or partition below its upper edge, thereby forming a handle chamber, a base member detachably secured to said supporting wall or partition, said base member having a ball race or groove formed therein, a cover member detachably secured to the base member, said cover member having a hole therein and provided with a ball race or groove, a rotary disk arranged between said members, said disk having ball races or grooves therein, ball bearings mounted in said ball races, a socket carried by the rotary disk and projecting through the hole in the cover member, and a handle detachably mounted in said socket and lying entirely within the chamber.

5. A can top provided with a supporting wall or partition situated below the upper edge of the can top to form a handle chamber, a base member comprising a body having a ball race or groove in its top wall and threaded exteriorly, and a flange projecting from said body, fastening means for detachably securing the base member to the supporting wall, a cover member comprising a top wall having a central opening therein, and a ball race or groove formed in its inner face and a flange threaded interiorly adapted to be mounted on the base member, a nut adapted to be threaded on the base member and jam against the edge of the cover member for locking the same in its adjusted position, a disk rotatably mounted between said members, said disk having a ball race or groove in each face, ball bearings mounted between the disk and members and adapted to run in the ball races, a socket formed with the disk and projecting through the opening in the cover member, said socket being threaded interiorly, a handle, the shank of which is adapted to be threaded into the socket, and a set screw mounted in said socket and adapted to engage the shank of the handle for holding the same in place.

In testimony whereof, I have hereunto affixed my signature.

SAMUEL HOUGH.

Copies of this patent may be obtained for five cents each, by addressing the "Commissioner of Patents, Washington, D. C."